United States Patent [19]

Bulfer et al.

[11] Patent Number: 5,392,357
[45] Date of Patent: Feb. 21, 1995

[54] SECURE TELECOMMUNICATIONS

[75] Inventors: Andrew F. Bulfer, Mountain Lakes, N.J.; Michael M. Kaplan, Rockport, Mass.; Bruce E. McNair; Carol A. Wegrzynowicz, both of Holmdel, N.J.

[73] Assignee: AT&T Corp., Murray Hill, N.J.

[21] Appl. No.: 803,809

[22] Filed: Dec. 9, 1991

[51] Int. Cl.⁶ .................. H04M 1/68; H04M 3/42
[52] U.S. Cl. .................. 380/33; 379/161; 379/201; 380/9
[58] Field of Search .......... 380/33, 9; 379/161, 379/201

[56] References Cited

U.S. PATENT DOCUMENTS 4,322,745  3/1982  Saeki et al. ............... 380/10
4,972,479  11/1990  Tobias, Jr. et al. ........ 380/33

FOREIGN PATENT DOCUMENTS 0225756  6/1987  European Pat. Off. ........ 380/33
1593913  7/1981  United Kingdom .......... 380/33

Primary Examiner—Gilberto Barrón, Jr.
Attorney, Agent, or Firm—Barry H. Freedman

[57] ABSTRACT

A security node disposed in the telecommunications network connecting calling and called parties transforms information (which can be voice, data, facsimile, video and other types of calls or messages) encrypted in a first format to (a) encrypted information in a different format or to (b) non-encrypted information, and vice-versa. The node is accessible from any location connected to the network. By routing calls or messages originated by the calling party and destined for the called party via the security node, and providing appropriate control signals to the node, the information may be encrypted only over a portion of the transmission path between the parties, and clear over the remainder of the transmission path. Alternatively, the information may be encrypted in different portions of the path using different encryption algorithms. This arrangement enables the parties to obtain relatively secure communications even if only one party has a security device at the originating or terminating end, or if the parties have security devices using different handshaking protocols and encryption algorithms.

23 Claims, 11 Drawing Sheets

SECURE TELECOMMUNICATIONS

TECHNICAL FIELD

This invention relates generally to secure telecommunications involving voice, data, facsimile, video and other information.

BACKGROUND OF THE INVENTION

Over the past several years, a great deal of emphasis has been placed on increasing the security of telecommunications systems, so that unauthorized persons cannot intercept and access voice, data, facsimile, video or other information not intended for them. Studies have shown that the commercial markets are well aware of the threats to their communications systems and have a clear sense of the business applications which are at risk because of potential breakdowns in security. The reasons for the heightened interest are many, including the increased use of cellular telephony in which a portion of the conversation is carried over the air and is thus more susceptible to attack, and the fact that other portions of the telecommunications network can be particularly susceptible to security breaches; i.e., wiring closets, junction boxes, manhole or telephone pole connections, facsimile machines, and especially cordless and cellular phones.

Despite the increased interest in secure communications, present security techniques have several limitations, including the general requirement that both the calling and called parties that desire to engage in a secure communication must have compatible security equipment that can send and receive encrypted signals using common handshaking protocols and encryption algorithms. If this is not the case, secure communications are normally not possible. Thus, at the present time, it is generally difficult for a calling party, such as a person using a cellular phone and thus desiring enhanced security, to communicate with a called party who is not properly equipped. One exception, described in U.S. Pat. 4,972,479 issued to R. W. Tobias, Jr. on Nov. 20, 1990, attempts to solve this problem, but does so in a complicated and uneconomical manner, involving a call diverter placed at the customer's home premises. In other situations, cellular telephone users can communicate with a mobile telephone switching office (MTSO) in an encrypted mode, and the MTSO completes the call to a destination in a clear (i.e., non-encrypted) mode. However, this type of arrangement is of limited usefulness, since access to the MTSO is limited to callers who are physically located in the area served by the MTSO; callers outside of this area cannot use the MTSO encryption facilities. Furthermore, the encryption arrangements currently used in the MTSO environment do not support conversion from one encryption algorithm to another, and do not support communications other than voice calls.

Likewise, it is generally not possible for a party receiving calls in an area in which he or she suspects possible compromise, to assure that his or her local phone link (e.g., from the terminating central office to the customer's premises) will receive encrypted information, in an instance when the call originator does not have a secure (i.e., an encryption-capable telephone. In addition, even if both calling and called parties do have secure telephones, they must both use the same protocols and algorithms in order to properly communicate with each other.

SUMMARY OF THE INVENTION

In accordance with the present invention, secure communication between calling and called parties is accomplished using a security node disposed in the telecommunications network connecting the parties and adapted to transform information (which can be voice, data, facsimile, video and other types of calls or messages) encrypted in a first format to (a) encrypted information in a different format or to (b) non-encrypted information, and vice-versa. By routing calls or messages originated by the calling party and destined for the called party via the security node, the information may be encrypted only over a portion of the transmission path between the parties, and clear over the remainder of the transmission path. Alternatively, the information may be encrypted in different portions of the path using different encryption algorithms. This enables parties to subscribe to a service in which they can obtain relatively secure communications even if only one party has a security device at the originating or terminating end, since attacks on the non-secure portion of the communications path, while possible, are unlikely. The invention also permits secure communication between parties using security devices with different handshaking protocols and encryption algorithms. Since the secure network service node may be accessed by many users at once, the cost associated with the service can be shared and thus reduced.

DETAILED DESCRIPTION

Figure 1:
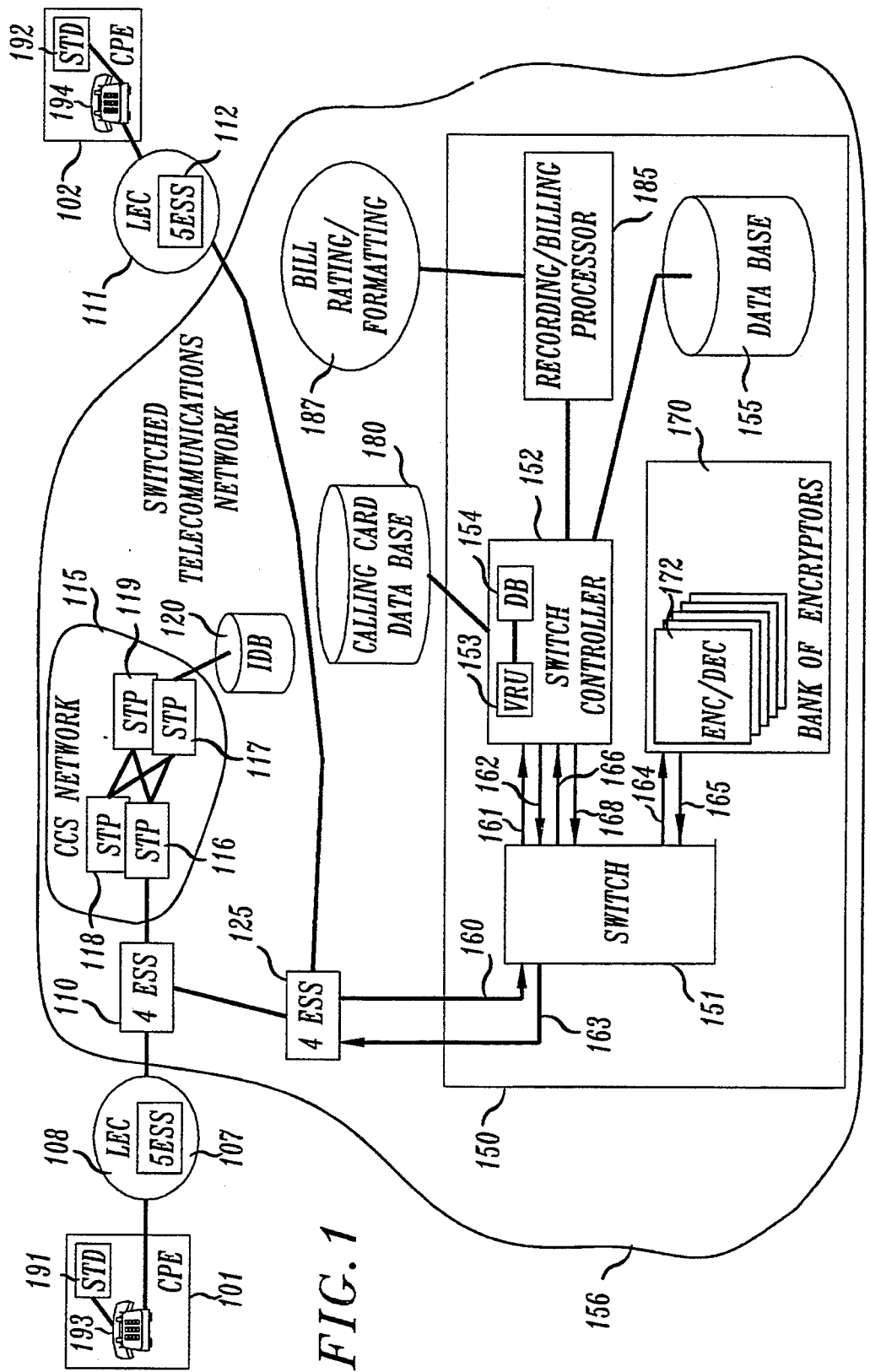
FIG. 1 is a block diagram illustrating a security node arranged in accordance with the present invention.

Referring first to FIG. 1, there is shown a block diagram illustrating the arrangement of a security node 150 constructed in accordance with the present invention, and its relationship with various components of local and interexchange telecommunications networks. Security node 150 is designed to effect communications such that (a) information carried in a portion of the transmission path (e.g., the portion between the calling party and node 150) can be secure, while information carded in another portion of the transmission path (e.g., between node 150 and the called party) is clear; or (b) information carded in the portion of the transmission path between the calling party and node 150 can be encrypted using a first encryption algorithm, while the information carried in the portion of the transmission path between node 150 and the called party is encrypted using a second, different, encryption algorithm.

In FIG. 1, communications originated by a calling party using near side customer premise equipment (CPE) 101 are destined for a called party using far side CPE 102, and vice versa. As used herein, "communications" may include analog or digital calls or messages that convey voice, data, facsimile, video or other information. Hereinafter, communications may be referred to simply as calls. CPE 101 and 102 may each include a commercially available secure telephone unit (STU), such as the STU-III telephone available from AT&T, or another secure terminal available from a vendor such as Motorola or General Electric. Alternatively, CPE 101 and/or CPE 102 may respectively include a secure telephone device (STD) 191, 192, i.e., an adjunct, that connects to an associated telephone 193, 194, or to a fax machine, data terminal, or other communication device. Note that there is no requirement that CPE 101 or STD 191 be of the same type as CPE 102 or STD 192; indeed, they can be obtained from different manufacturers, use different encryption algorithms or handshaking protocols. Also, either CPE 101 or CPE 102 (but not both) can be an ordinary (non-secure) terminal or device.

For the purposes of further explanation, CPE 101 is assumed to be arranged to transmit and receive outbound (i.e., from the calling party to the security node) and inbound (i.e., from the security node to the called party) calls that can be either clear or secure. Switches in CPE 101 control the mode, clear or secure, in which the equipment operates; mode changes are made either locally, under direct user control, by actuating the switches or alternatively, in response to a remotely generated signal. For convenient data entry, CPE 101 may be equipped with a touch tone generator and a keypad; status indications can be given to the user through one or more display indicators, such as LED display lamps. For the purposes of the immediately following description, it is assumed that CPE 102 is a conventional telephone, since secure-to-clear communications are described first. Later in the detailed description, secure-to-secure communications are described.

While telecommunications "access" to security node 150 can be gained by any convenient access mechanism, such as by using (a) a software defined network (SDN) access number; or (b) a POTS (plain old telephone service) number in conjunction with a premium service such as MEGACOM available from AT&T; or (c) an 800 number, it is assumed, for the purposes of explanation, that a calling party using CPE 101 gains access to node 150 by dialing a predetermined toll-free number, such as 1-800-ENCRYPT. When that number is dialed, the call is routed through a switch 107 (e.g., a #5ESS ® electronic switch available from AT&T) in a local exchange carrier (LEC) office 108 serving the calling party, to an interexchange carrier switch 110, typically an AT&T #4ESS Action Control Point (ACP) that is part of a switched telecommunications network that is designated generally as 156. Switch 110 responds by generating a signaling message (usually in the CCS7 signaling format) and routing it through a common channel signaling (CCS) network 115 including a plurality of interconnected Signal Transfer Points (STPs) 116, 117, to an InWATS Data Base (IDB) 120, or to a network control point (NCP) in a software defined network, depending upon the subscription plan of the calling party. IDB 120 contains records for each dialed 800 number, and performs a look-up operation in order to generate a routing number associated with the dialed number, which is sent back to switch 110. In response to the routing number, switch 110 in turn routes the call to security node 150, usually through other components of switched telecommunications network 156, which may include another #4ESS switch 125. It is to be noted that a calling party may be connected directly to LEC office 108, as shown in FIG. 1, or connected via a PBX switch or other customer premises equipment, not shown. It is also to be noted that other access and signaling arrangements may be used to interconnect CPE 101 with security node 150.

When the call is received in security node 150, the node may also receive from switch 107, 110 or 125, a CCS message containing the dialed number and automatic number identification (AND information identifying CPE 101. However, the availability of such information depends upon the capabilities of the specific switches and signaling equipment being used by LEC office 108 and network 156. For the purposes of the following explanation, it will be assumed that calling party information is not available without prompting the caller.

As shown in FIG. 1, security node 150 includes a switch 151, which may, for example, be a Definity (TM) digital PBX available from AT&T, that is arranged to connect incoming calls received on trunk 160 to an available port of a switch controller 152, via a line in line group 161. Switch 151 is also arranged to connect calls to available encryptors in an encryptor bank 170, via line group 164. A bus 162 between switch 15 1 and controller 152 enables communication of control signals. Controller 152, which may be a Conversant ® system available from AT&T, includes a voice response unit (VRU) 153 that can transmit voice prompts to the calling party, in accordance with a script stored in a local database (DB) 154. Controller 152 can also perform a variety of other functions by itself or in combination with switch 151. For example, it can receive and logically process information entered by the caller in response to prompting, in conjunction with information retrieved from database 164. Such information can be entered by the caller using the touch tone dialing pad which is normally part of CPE 101, or via a keyboard or other separate input device. In some cases, information can be input as voice responses that are interpreted using "speech to text" processing capabilities. In addition, controller 152, in conjunction with switch 151, can (a) initiate (or command switch 151 to initiate) calls by generating dialing sequences and applying such sequences to switch 151, (b) simultaneously receive and process calls at several inputs, and (c) bridge (or command switch 151 to bridge) incoming and outgoing calls together. Controller 152 can also remain in the call path for a specified time or interval in order to detect and act upon control signals applied to the call path by either the calling or called parties. All of the foregoing functions are available in the Conversant system mentioned above, and in similar systems available from other vendors.

The process followed in controller 152 when a call is received from a calling party that dialed the number of node 150 (e.g., 1-800-ENCRYPT), desiring to effectuate secure-to-clear communication (i.e., secure between CPE 101 and security node 150 and clear between security node 150 and the called party), is shown in flow diagram form in FIG. 2 and summarized as follows:

Upon receipt of a call (step 201), switch controller 152 prompts the caller (step 203) for information needed to complete the call. This may include information identifying the calling party as a subscriber, e.g., a "login"; information verifying the identity of the calling party, e.g., a password; and information identifying the called party, e.g., the telephone number of CPE 102.

At this point in the process, information identifying the "type" of encryption being used by the calling party may also be received in controller 152 in response to a voice prompt. However, it may be preferable to automate the provision of this information, such as by including a code indicative of the encryption type in the "begin secure transmission" signal exchanged before encryption begins. It is to be observed, however, that the encryption "type" may alternatively be obtained at a subsequent point in the set-up process as discussed more fully below. For the purposes of the following description, it is assumed that the encryption type is obtained in step 206, and stored in database 154. In any event, it is noted here that "type" information is required because node 150 is arranged to support customers that use a variety of different CPE that incorporate and use different encryption algorithms. Accordingly, the details of the specific type of encryption used by the calling party is required in order to effectuate appropriate processing in node 150.

Upon receipt of caller-entered information, controller 152 checks database 155 (step 207) to see if the caller is an authorized user. If unauthorized, controller 152 plays a terminating announcement in step 209 while if authorized, controller 152 continues to collect information entered in response to the remaining prompts. In addition, controller 152 sends calling party identification and called party information to a recording and billing processor 185 in order to initiate the billing process (step 211). Processor 185 periodically communicates with an automatic bill rating and formatting system 187 which records call details for subsequent bill procession (step 213). Call details may include date, time and duration of session, number called, etc. The billing process is shown in FIG. 2 as continuing independently of the "main" call set-up and encryption process involving node 150.

When controller 152 has determined the type of encryption being used in CPE 101, a lookup operation is performed in database 154 (step 215) to determine a hunt group designation associated with selected encryptors within bank of encryptor bank 170 that use encryption algorithms that can effectively process (i.e., decrypt) encrypted signals generated in CPE 101. Since several calls using the same encryption type can be processed at the same time, encryptor bank 170 contains several such encryptors, each of which has an individual access number in the same hunt group.

Controller 152 then outpulses control signals (generally tones) to switch 151 on line 162, representing the hunt group associated with the selected encryptor type being used by the caller. When the hunt group is called, the next available encryptor of the appropriate type (e.g. encryptor 172 in FIG. 1) is selected by switch 151. However, if no encryptor of the selected type is available (step 217), the process is terminated (step 209).

When a particular encryptor is selected, its input end (with respect to calls generated in CPE 101) is connected to switch 151 via line 164 (step 219). Note that in the forward direction, i.e., from CPE 101 to CPE 102, encryptor 172 is actually operating to decrypt calls that have been encrypted in CPE 101, so that such calls can be extended to CPE 102 from node 150 in the clear.

Because the encryptors within encryptor bank 170 may themselves contain little communications signaling capability, each encryptor, including encryptor 172, can be arranged so that its output end (with respect to calls generated in CPE 101) is connected to a line side termination in switch 151, in order to allow signaling to be performed by controller 152. Specifically, when encryptor 172 is selected, its output end is connected to line 165 in switch 151, thereby supplying dial tone to controller 152.

In response to receipt of dial tone, switch controller 152 is arranged to generate dialing signals that are applied to switch 151 and cause that switch to initiate a second call to controller 152 (step 221). This call, which is extended from switch 151 to controller 152 via line 166, is desirable since it enables the controller to continue to monitor calls in the clear mode (i.e., not encrypted) after the call setup process has been completed. As explained more fully below, the first connection through controller 152, which is dropped after call setup is completed, places the controller in a position in the call flow sequence such that encrypted (rather than clear) voice/data is received.

Controller 152 is now in a position to complete the call to CPE 102. This is done by placing the incoming call (i.e., the call from CPE 101 to controller 152 via encryptor 172) on hold and initiating a new call (step 223) to the called party number that was provided earlier and that is stored in database 154. Routing of this call is from controller 152 to switch 151 via an line 168. From switch 151, the call is routed to switch 125 via trunk 163 and then through telecommunications network 156 to the intended destination, CPE 102, using conventional call set-up and signaling procedures. Egress from security node 150 to the called party may be provided through MEGACOM ® service, SDN, or other outbound service (i.e., PRO WATS, WATS or Business Long Distance available from AT&T). The connection between telecommunications network 156 and CPE 102 is typically made through a second LEC office 112, which includes a terminating #5ESS switch 111.

When the called party answers, answer supervision is detected in switch 125 and passed through switch 151 to controller 152. In response, controller 152 is arranged to signal switch 151 to bridge (step 225) the call TO controller 152 (on line 161) with the call FROM controller 152 (on line 162). This removes one "appearance" of controller 152 from the call path, but leaves the second appearance intact. This allows controller 152 to continue to "monitor" the call (step 227) for the occurrence of control signals (touch tone signals or voice, which are clear, rather than encrypted) after an end to end connection is made, so that certain other actions, described below, can be taken during the progress of a call.

Communications in the reverse direction, i.e., from the called party (CPE 102) to the calling party (CPE 101), once the call path has been set up in switch 151, follows the same path and uses encryptor 172 as an encryption (rather than a decryption) unit for the return direction.

Figure 3:
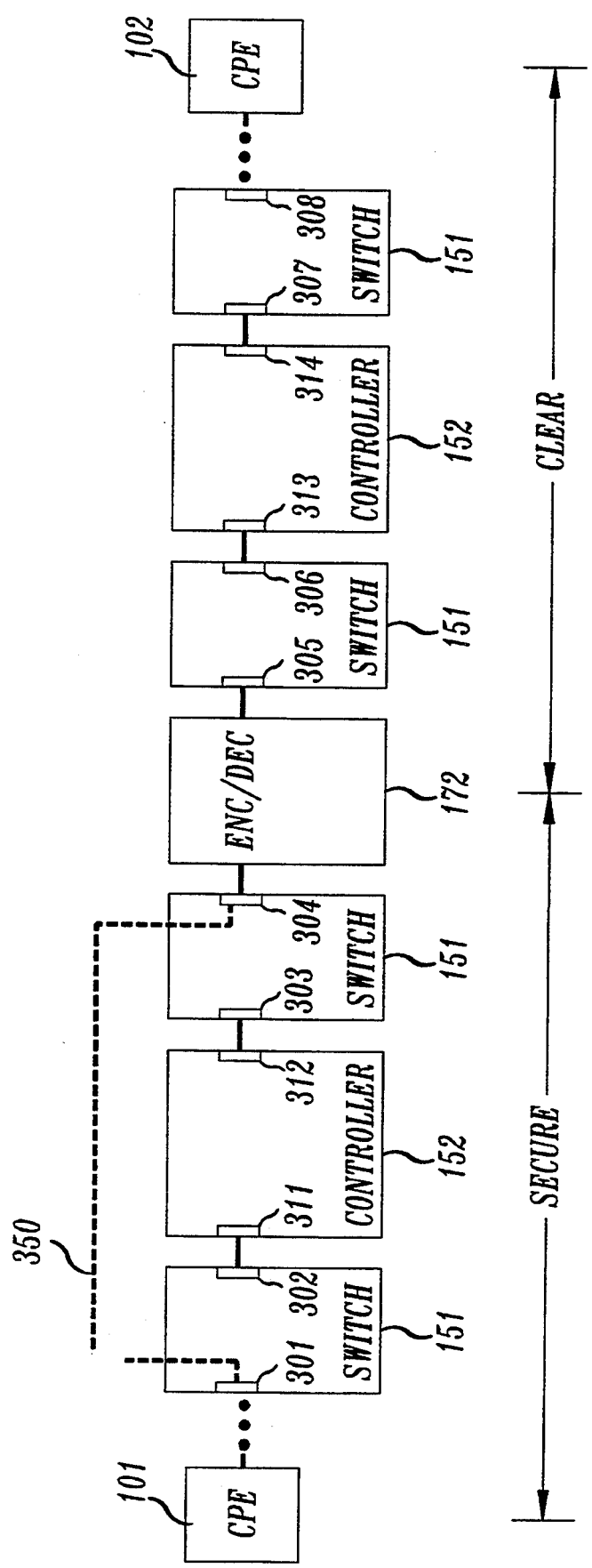
FIG. 3 is a hardware flow diagram useful in explaining the process for initiating secure-to-clear communications and illustrating the path through some of the components of FIG. 1 for such calls or messages.

Before describing the training sequence used to effect secure communications between the calling party and node 150, it will be instructive to describe the call setup process in an alternate form, in conjunction with FIG. 3, in which the same designations are retained for the various components in FIG. 1. However, the call flow is shown in a "linear" form, i.e., the multiple appearances of switch 151 and controller 152 have been "unwrapped".

In FIG. 3, a call initiated by CPE 101 is routed through the local and toll the call to a first input port 311 of controller 152 via its output port 302. After the networks, including, for example, switches 107, 110 and 125, which are not shown in FIG. 3, and arrives at a first input port 301 of switch 151 (step 201), which routes controller has obtained sufficient information to determine the type of encryption that may be performed in CPE 101, (steps 203,205), a connection is made by controller 152 to one of the encryptors (illustratively encryptor 172) in encryptor bank 170 (steps 207,215,217). This connection is made by (1) controller 152, at its output port 312, seizing an available input (port 303) in switch 151, and (2) dialing the hunt group number associated with the appropriate type of encryptor. This causes switch 151 to route the call from an output port 304 to encryptor 172 (step 219).

The output side of encryptor 172 is connected to an input port 305 of switch 151 (step 221), which provides a dial tone back to controller 152. Upon receipt of this dial tone, controller 152 outputs from port 312 the signals (e.g., digits) required to connect the call to its destination, via a second connection through controller 152 (step 223). While this connection can be established in several ways, the following procedure is preferred: First, the digits output from port 312 cause switch 151 to initiate a call and thereby to connect its input port 305 to an output port 306 that is, in turn, connected to a second input port 313 of controller 152. Controller 152, in turn, receives the output signals (digits) and initiates a new call through switch 151 by providing the control signals indicative of the dialed number from its output port 314 to an available input port 307 of switch 151. This call is initiated when switch 151 connects port 307 to an output port 308 that is in turn connected to switch 125 in the switched telecommunications network 156.

When answer supervision is received from the called party using CPE 102, a clear communication path has been established from CPE 101 through node 150 to the called party CPE 102. At this point, controller 152 signals switch 151 to bridge the call input at port 301 with the call output at port 304 (step 225). This establishes a bypass 350 around one appearance of controller 152, but allows the second appearance of that controller to remain in the clear portion of the call path, in order to monitor the call (step 227) and detect control signals or call status conditions and, in response, perform various other call setup and/or maintenance functions.

Figure 2:
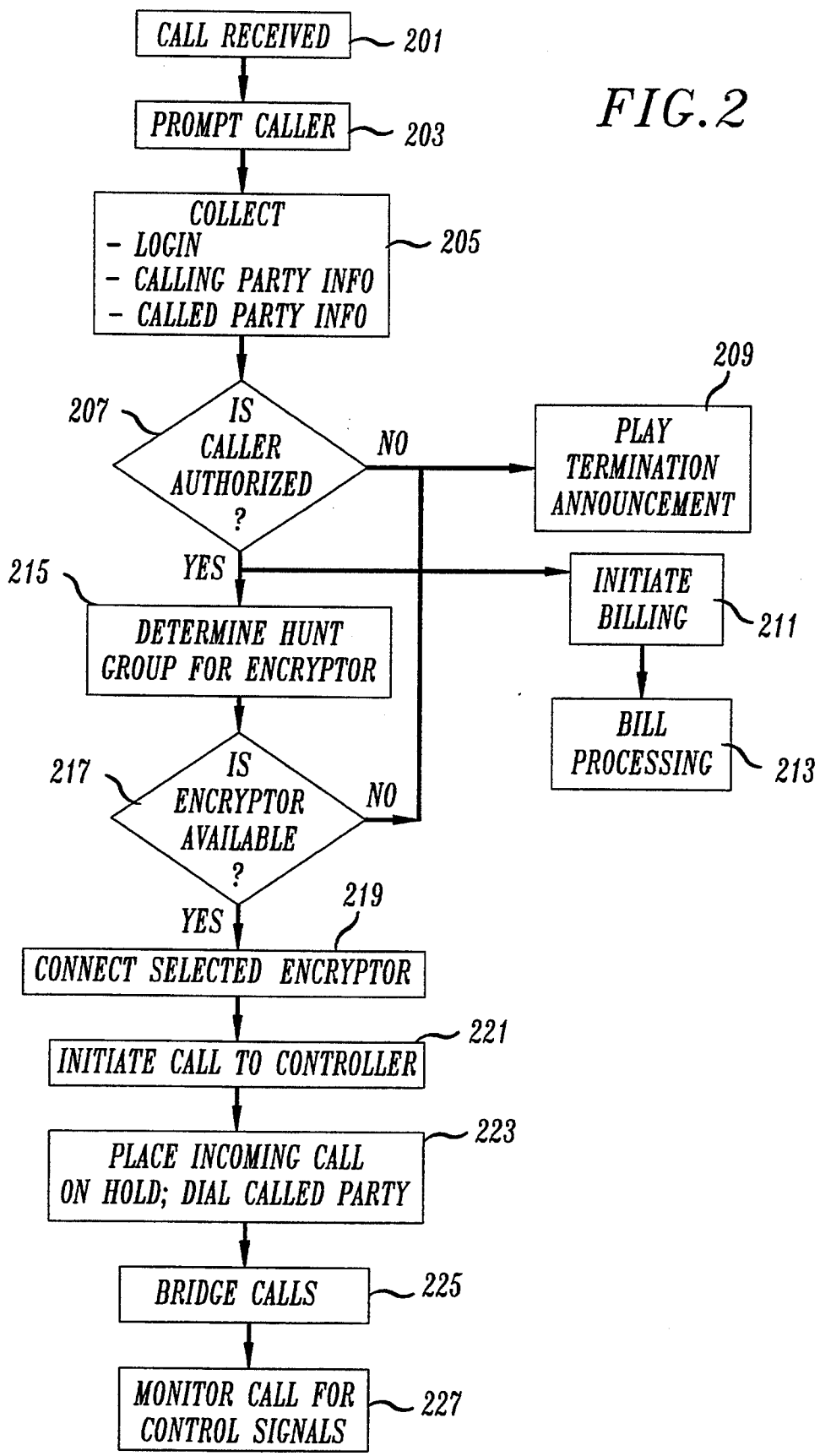
FIG. 2 is a flow diagram illustrating the steps followed in controller 152 of FIG. 1 to set up a "secure-to-clear" communication path, i.e., a secure connection between a calling party (CPE 101) and the security node and a clear connection between the security node and the called party (CPE 102)
Figure 4:
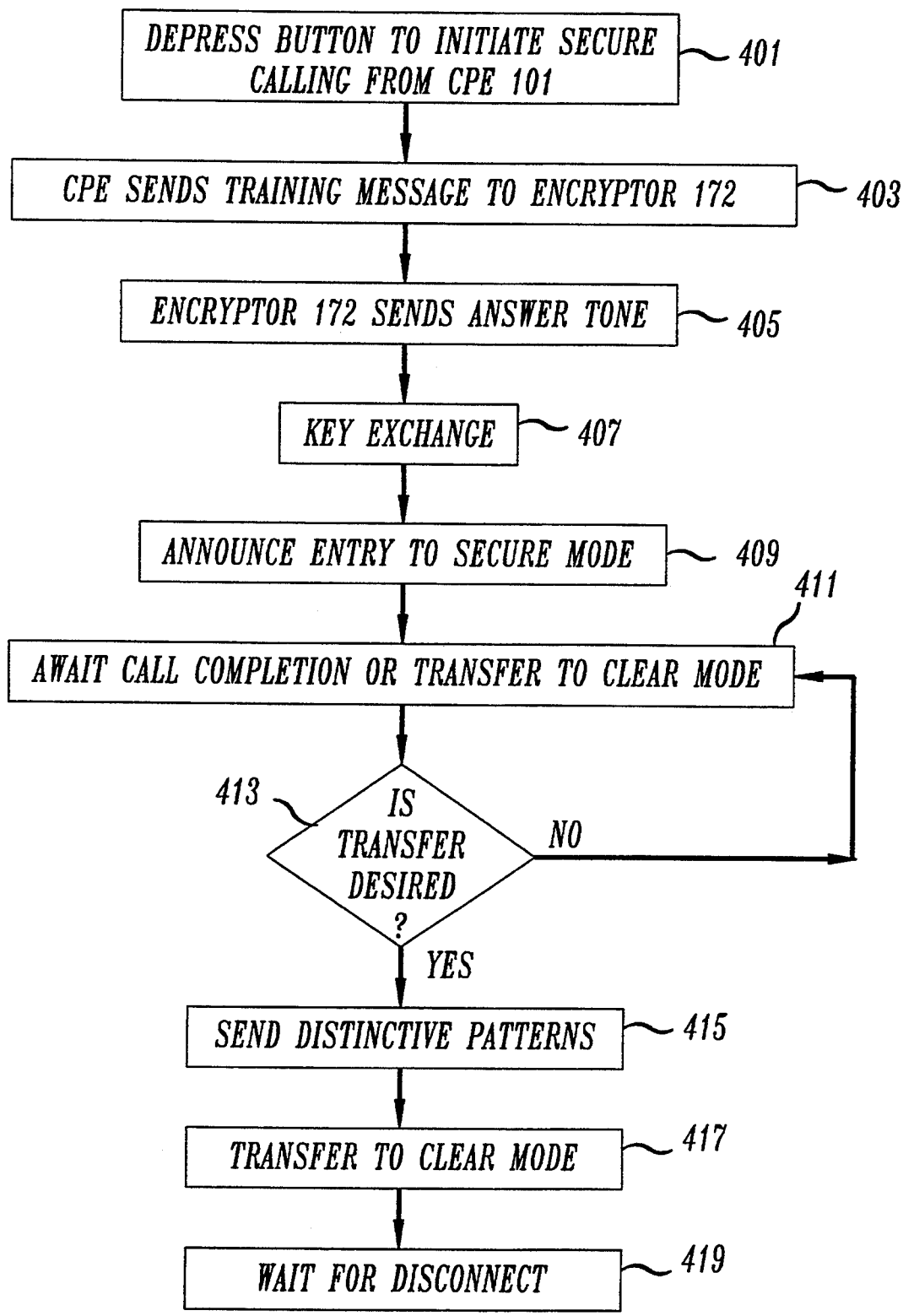
FIG. 4 is a flow diagram illustrating the handshaking steps followed in encryptors in encryptor bank 170 and in CPE 101 and 102.

The process described in conjunction with FIG. 2 establishes a clear communication path between CPE 101 and CPE 102 via security node 150. At some time during the call, the calling party may decide to encrypt the portion of the call between CPE 101 and node 150. The training sequence process by which communication between CPE 101 and security node 150 can be switched from clear to encrypted is shown in FIG. 4, which should be read with continuing with reference to FIG. 3. When the calling party wishes to begin encrypted communication, he or she notifies the destination party of this intent and then institutes transfer to the secure node by, for example, pushing a "secure calling" button on CPE 101 (step 401), thereby triggering the encryption unit within CPE 101 to send a message similar to a modem training message to encryptor 172 in encryptor bank 170 (step 403). In response, encryptor 172 sends a modem answer signal (step 405) to CPE 101. Some indication at CPE 101, such as a flashing indicator light associated with the secure calling button, may be used to indicate that training with encryptor 172 is ongoing.

When the initial training is complete, a key exchange sequence is initiated (step 407), using well known data communications protocols preparatory to establishing secure communications. One such protocol is described in ANSI standard X9.17, but numerous other techniques are well known to persons skilled in the art. If desired, the called party can receive an announcement, generated by controller 152, during encryption training. Upon successful completion of the key exchange, CPE 101 may be arranged so that the secure indicator light stops flashing and remains lit. Controller 152 may detect the completion of training the key exchange sequences, such that an announcement may then be played to the called party (step 409), indicating that the call is going into the secure mode. Once in the secure mode, the call flow continues through encryptor 172 and controller 152 for the duration of the call (step 411).

If the calling party wishes to change from the secure to the clear mode, the clear button on CPE 101 may be pressed. This signal is detected in encryptor 172 (step 413), which responds by changing into the clear mode. This change to clear mode may be effected by CPE 101 sending (step 415) a distinctive data pattern, normally not occurring in encrypted data (e.g., a repetitive pattern such as 0011001100110011 . . . ), signaling a request to transfer the call to the clear mode. Encryptor 172, detecting this unique pattern, may similarly respond with a different unique pattern, such as 000111000111, to indicate its having received a request from CPE 101 to switch to clear mode. CPE 101 may then respond to the signal returned by encryptor 172 with a third unique pattern, e.g., 0101010101010 . . . , completing the secure-to-clear handshake (step 417). While this handshaking is illustrative of a protocol that may be used, other methods will be apparent to those skilled in the art. The call then continues until a termination or disconnect signal is detected (step 419).

The present invention can also be used to make secure-to-secure calls between a calling party and a called party, when each party uses a different type of encryptor/decryptor, i.e., in circumstances in which CPE 101 and CPE 102 do not use the same encryption algorithms. In this embodiment, security node 150 provides encryption conversion between non-compatible encryption/decryption devices, by using two encryptors available in encryptor bank 170.

Figure 5:
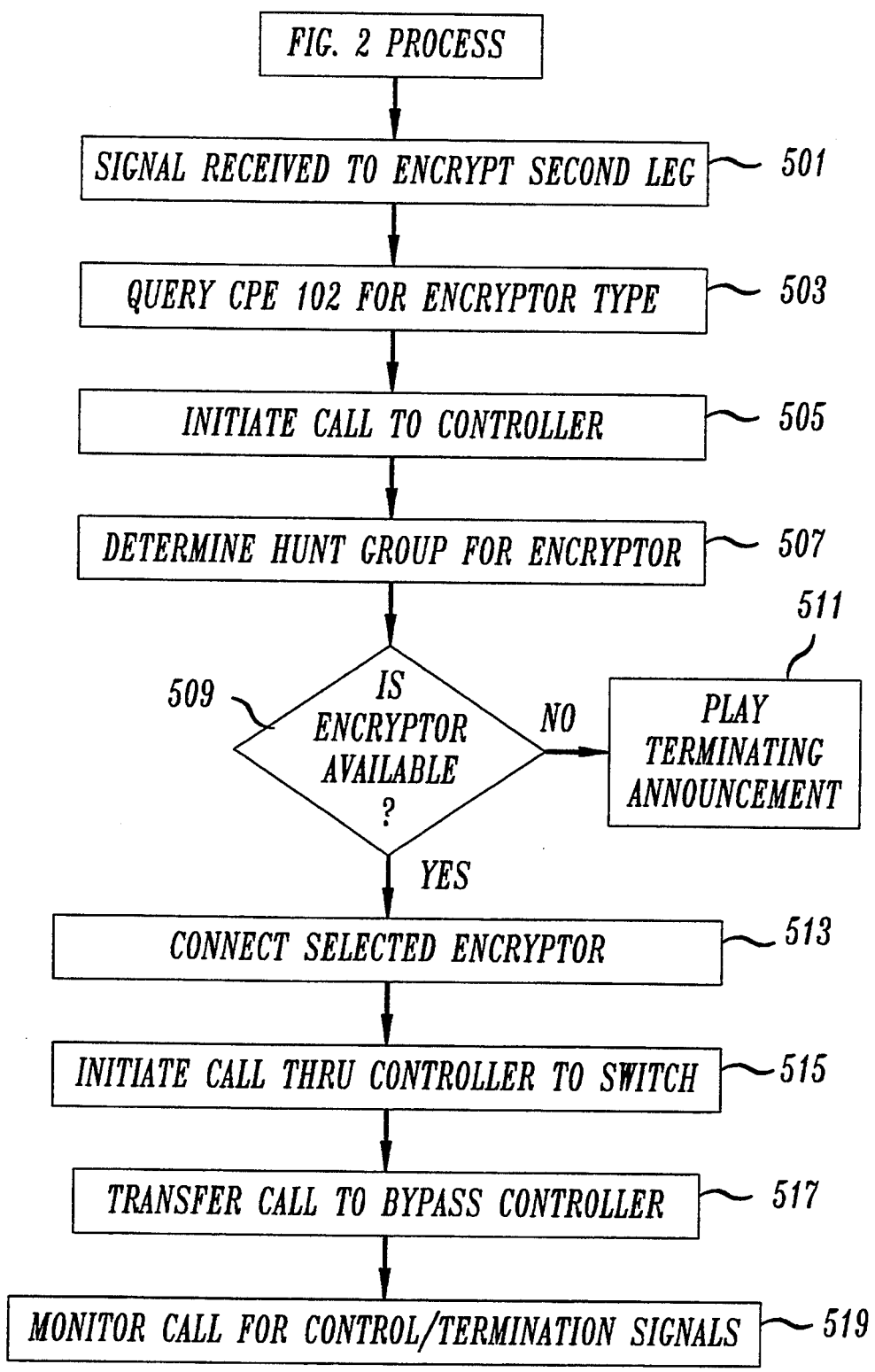
FIG. 5 is a flow diagram illustrating the steps followed in controller 152 in order to set up "secure-to-secure" communication.
Figure 6:
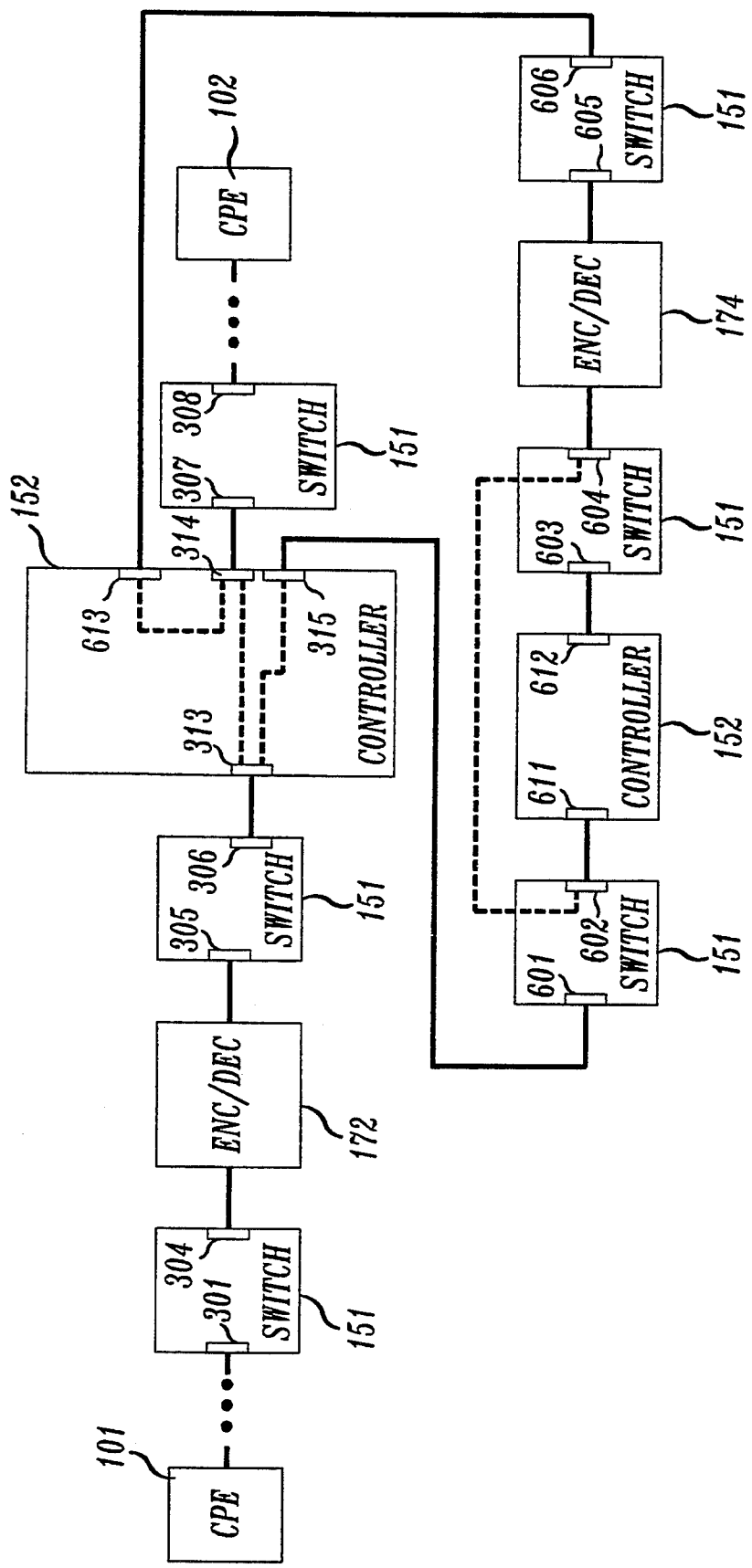
FIG. 6 is a diagram similar to FIG. 3 showing the additional elements involved in the setup process for initiating secure-to-secure communication.

The process used to originate a secure call, with encryption conversion at node 150, is illustrated in flow diagram form in FIG. 5. The initial steps in this process are the same as those described above in conjunction with secure-to-clear calls; accordingly, the process of FIG. 2 is performed first, to establish a secure path between CPE 101 and node 150 and a clear path from node 150 to CPE 102. FIG. 6 illustrates the hardware elements involved in this type of call, and should be consulted in reading the following description.

When communications in the second leg of the call path, (i.e., from node 150 to CPE 102 at the called party location) are also to be encrypted rather than clear, controller 152 is signaled, usually by the called party (step 501). (However, in some arrangements, the decision to encrypt both call legs may be signaled by either the calling party using CPE 101 or by the called party using CPE 102.) Upon detection of a control signal indicating that a second encryptor is needed in the call path, controller 152 queries CPE 102 (step 503) to determine the type of encryptor being used. This interrogation provides controller 152 with information needed to select an appropriate (second) encryptor from encryptor bank 170.

Controller 152 signals switch 151 from a second output port (port 3 15 in FIG. 6), to establish a second call that is routed through controller 152 (step 505). This arrangement is used because many PBX switches are not presently capable of "transferring" or "bridging" outgoing calls, and can only transfer or bridge incoming calls. This arrangement is also used so that controller 152 remains in the portion of the call path in which the communications are clear. This will be appreciated more fully below. Note in FIG. 6 that the second call to controller 152 originates from port 315 and extends to input port 601 of switch 151, which connects the call via its output port 602 to controller 152 at a different input port 611.

Information identifying the hunt group associated with the particular encryptor type being used by the called party in CPE 102 is determined (step 507) by controller 152, using a look-up in database 154. Controller 152 then initiates a call to a number associated with the hunt group which is output from port 612 of controller 152 and applied to input port 603 of switch 151, causing the switch to connect (step 513) the call to the next available encryptor in encryptor bank 170 of the appropriate type (e.g., encryptor 174 in FIG. 6), providing that it is determined (step 509) that an appropriate encryptor is available. If not, a termination message is played in step 511.

Encryptor 174, like encryptor 172, is arranged so that its output end is connected to a line side termination (port 605) in switch 151. In this instance, however, encryptor 174 is also arranged such that a signal necessary to effectuate a connection in switch 151 between output port 606 to a different input port (port 613) of controller 152 is always produced when encryptor 174 is actuated. This may be accomplished by arranging some encryptors in encryptor bank 170 to be connected to "virtual hot line" connections in switch 151 that automatically connect to available ports in controller 152 when that encryptor is activated by receiving a call at its input port. A virtual hot line may be implemented by programming switch 151 to detect the off-hook condition of one or more of its line side terminations and, upon detecting the off-hook condition, automatically routing the call to a preprogrammed destination without any further signaling from controller 152 or the CPE.

Figure 7:
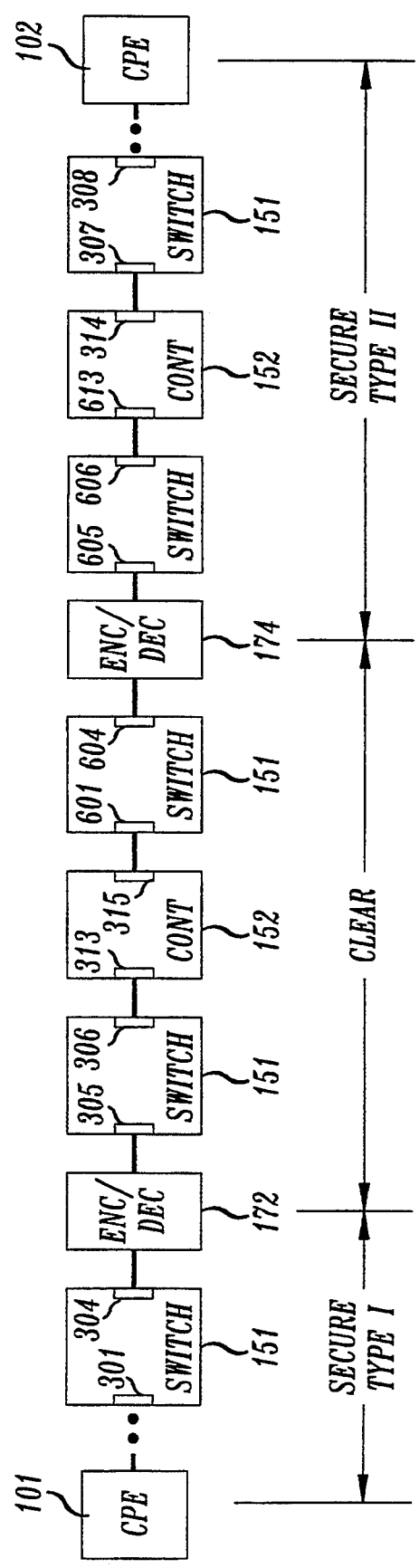
FIG. 7 illustrates the path after secure-to-secure communication has been established using the arrangement of FIG. 6.

When the "hot-line" call is received by controller 152 at port 613, controller 152 is arranged to transfer (step 517) the connection between its input port 313, from output port 314 to output port 315. Concurrently, ports 613 and 314 are connected within controller 152, and ports 602 and 604 are connected within switch 151. In this status, the call path is a shown in FIG. 7. Note the following:

(a) Two encryptors, 172 and 174 are now in the call path, the first being of the appropriate type to convert encrypted messages received from CPE 101 from secure format to clear format, and the second being of the appropriate type to convert encrypted messages received from CPE 102 from secure format to clear format.

(b) Controller 152 remains in the clear portion of the call path between encryptors 172 and 174. Accordingly, controller 152 can be signaled by parties at either end of the circuit, if desired.

The process of FIG. 5 is completed by monitoring the call (step 519) for control or termination signals. As with the embodiment described earlier, call termination is effected conventionally, when either CPE 101 or CPE 102 hangs up. In such event, a disconnect signal is detected by switch 151 or controller 152, and the connections are dropped.

Figure 8:
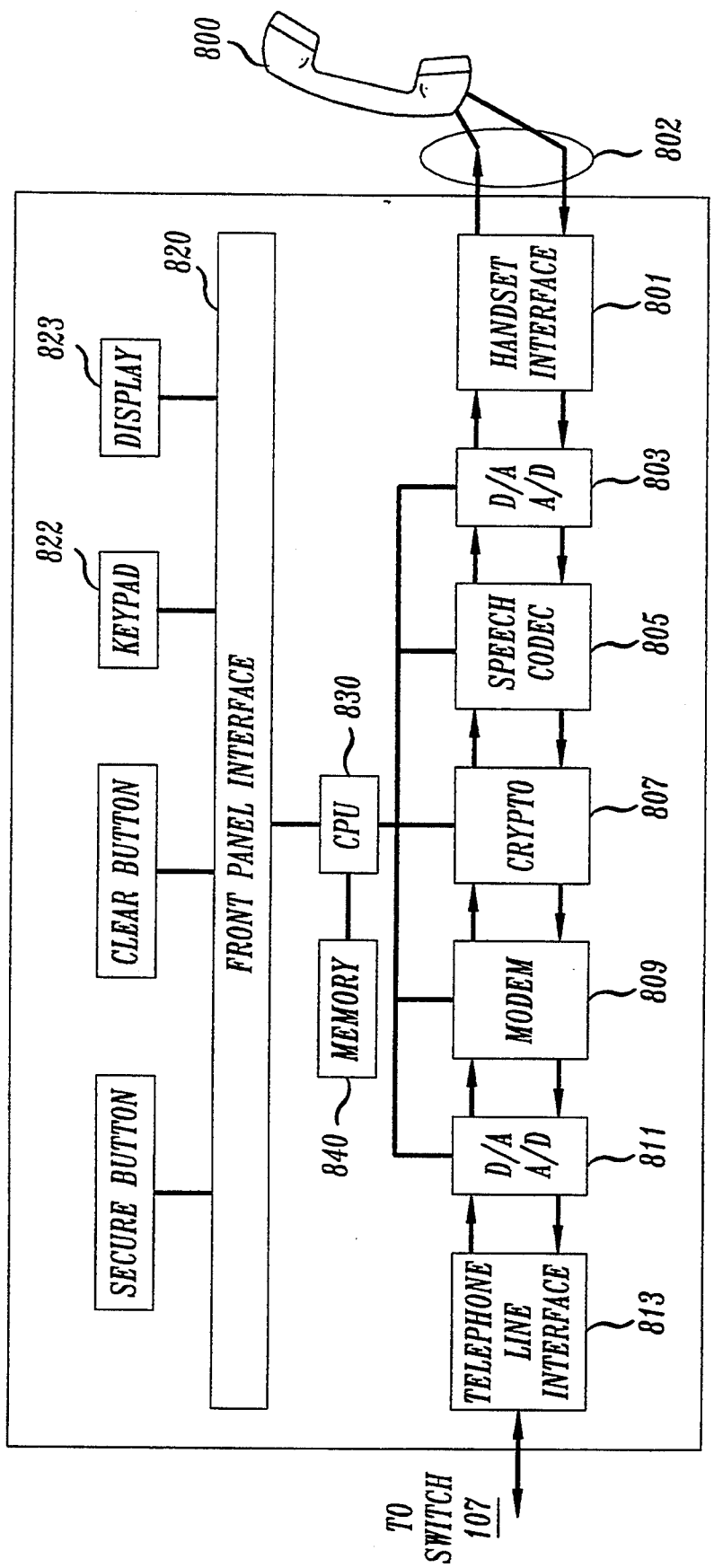
FIG. 8 is a block diagram illustrating the elements of typical customer premise equipment, such as CPE 101 of FIG. 1.

Referring now to FIG. 8, there is shown a block diagram illustrating the elements contained within typical customer premises equipment, such as CPE 101 of FIG. 1. Assuming that CPE 101 is a secure voice terminal, a handset 800 containing a conventional audio input (microphone) and audio output (speaker) is connected to a handset interface 801, which receives and transmits analog (~200 to 3000 Hz) signals on lines 802. With respect to outbound signals (generated in CPE 101 and destined for a called party via switch 107), the output of interface 801 is connected to an analog to digital converter 803, which digitizes the audio band signal, illustratively to a 56 Kb/s sampled and quantized pulse code modulated (PCM) digital signal. This is done because digital processing in CPE 101 is preferred.

The output of converter 803 is applied to a speech coder/decoder (codec) 805, which compresses the received bit stream to a digital word stream, typically at 2400 bps. One type of compression can be provided by a code excited linear prediction (CELP) encoder/decoder of the type found in the STU III secure voice terminal available from AT&T; other codecs are also available. This compression coding is done to facilitate encryption/decryption, which is accomplished in cryptographic module 807. This module may be arranged to perform any well known translation between clear and secure data, using a stored encryption key. The essence of encryption is to allow only authorized users that have access to a encryption key to then be capable of decrypting the secure data to recover the original information. One example of a cryptographic module is described in Federal Information Processing Standard (FIPS) 140-1, "Security Requirements for Cryptographic Modules", draft dated July, 1990.

The output of cryptographic module 807 is applied to a modem 809 and then to a D/A and A/D converter 811, which together are interposed in the signal path in order to convert the 2400 bps digital signal output from cryptographic module 807 a sequence of analog modem tones that is suitable for transmission on an analog telephone line. Modem 809 itself performs the conversion of the modem output at 2400 bps to a digital bit stream, illustratively at 56 Kb/s, that is suitable for application to a digital telephone line. This bit steam represents audio tones. Because the signal has been encrypted (scrambled), the tones are scrambled such that an unauthorized listener would not be able to determine the intelligence contained in the original voice message.

Because CPE 101 is typically connected to the telecommunications network through a traditional analog subscriber access loop to LEC switch 107, the output of modem 809 is convened back from digital (56 Kb/s) to analog form in D/A and A/D converter 811, before being applied to the loop via telephone line interface 813. In cases where digital access is provided, D/A and A/D converter 811 and/or interface 813 may not be necessary.

With respect to inbound signals (generated in security node 150 and destined for CPE 101 via switch 107), similar conversion is accomplished. Specifically, analog inputs, representing scrambled audio tones, are received via interface 813 and converted to digital form in D/A and A/D converter 811. The PCM bitstream, representing a series of analog tones is convened to a bit stream at (illustratively) 2400 bps in modem 809, decrypted in cryptographic module 807, and symbols reconverted to a digital bit stream in codec 805, representing the original analog speech. Finally, the digital bit stream is converted to intelligible analog form in converter 803 before being applied to handset 800 via interface 801.

The CPE arrangement illustrated in FIG. 8 also includes a front panel interface circuit 820, which receives inputs from clear and secure buttons 821 and 824, a keypad or other input device 822, and is arranged to activate a visual display 823 such as may be provided by a LED, LCD or similar display device. Inputs received in interface 820 may be locally processed in a microprocessor 830, operating under the control of programs stored in memory 840. Microprocessor 830 also interacts with, and may be programmed to control and coordinate, the operation of D/A and A/D converters 803 and 811, codec 805, modem 809, and, in most instances, cryptographic module 807. This latter interaction may involve secure key storage/retrieval and other encryption related functions.

While FIG. 8 contemplates CPE in which encryption/decryption elements and related signal conversion is performed internal to a telephone station, in some arrangements, as stated previously, it may be preferable to attach an external device, known as a "secure telephone device" (STD) to an otherwise ordinary terminal, in order to give the terminal the same functionality as described above. In this arrangement, the STD is attached to the users telephone between the handset and the telephone base. A separate AC transformer supplies power to the STD. Preferably, the STD is compatible with many types of electronic, modular, touch tone business and residential phones. If desired, a user may configure the STD through a display device and software defined switches on the STD. Such a display device provides the user with identification of secure or clear mode and a visual signal to assure the user that an unauthorized person has not altered their communications. The STD can be small and light enough to be portable, such that it can be conveniently carded between locations (i.e., office, home, travel).

Figure 9:
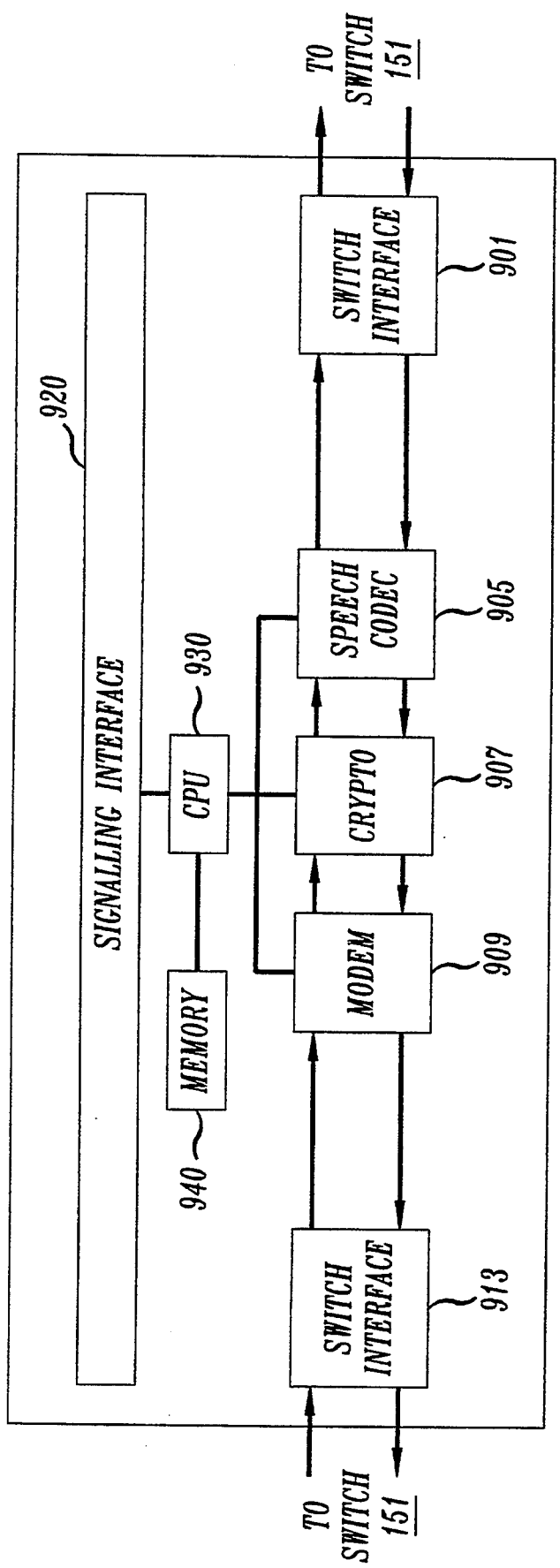
FIG. 9 is a block diagram illustrating the elements of a typical encryptor, such as encryptors 172 and 174 within encryptor bank 170.

FIG. 9 is a block diagram illustrating the elements contained within a typical encryptor such as encryptor 172 or 174 within encryptor bank 170. Many of the elements, such as codec 805, cryptographic module 807 and modem 809, are the same as those described in connection with FIG. 8. However, it will be noted that each encryptor typically receives inputs from, and supplies outputs to, a PBX or switch, particularly a digital switch 151 of FIG. 1. For this reason, analog to digital conversion (and vice versa) may not be needed, and D/A and A/D converters 803 and 811 are not present. Further, the functions performed by handset interface 801 and telephone line interface 813 are performed by a pair of PBX interface circuits 901,913.

The encryptor of FIG. 9 also includes a signaling interface 920 in place of front panel interface 820 of FIG. 8. This is because the encryptor is advantageously positioned within the telecommunications network, and is signaled by calling and called parties using the capabilities of controller 152.

The call origination sequence described above was illustrative, and persons skilled in the art will appreciate various alternative processes that may be available where additional intelligence is built into other components of the telecommunications network. An example will illustrate. Assume that database 120 in FIG. 1 is able to retrieve additional information about selected calling and called party numbers, and that switches 110 and/or 125 are capable of performing interactive scripts in response to such information received via signaling network 115. In this embodiment, a caller dials the security node 150 access number, and the call is recognized by database 120 as requiring special treatment. The caller is prompted by switch 110 (for example) to identify the call type, i.e., if the call is secure-to-clear, clear-to-secure, or secure-to-secure. For a secure-to clear call, the caller is prompted to input a User I.D. number using the touch tone pad on CPE 101. Switch 110, in conjunction with database 120, attempts to validate the User I.D. number. If the User I.D. cannot be verified, the caller is informed of the status and asked to re-enter a valid User I.D. #. If the User I.D. number cannot be validated after two attempts, the caller is notified that there is a problem, asked to call a support center with a different telephone number for additional support, and the call is dropped. Thus, portions of steps 203, 205 and 207 of FIG. 2 may be performed outside of node 150.

Figure 10:
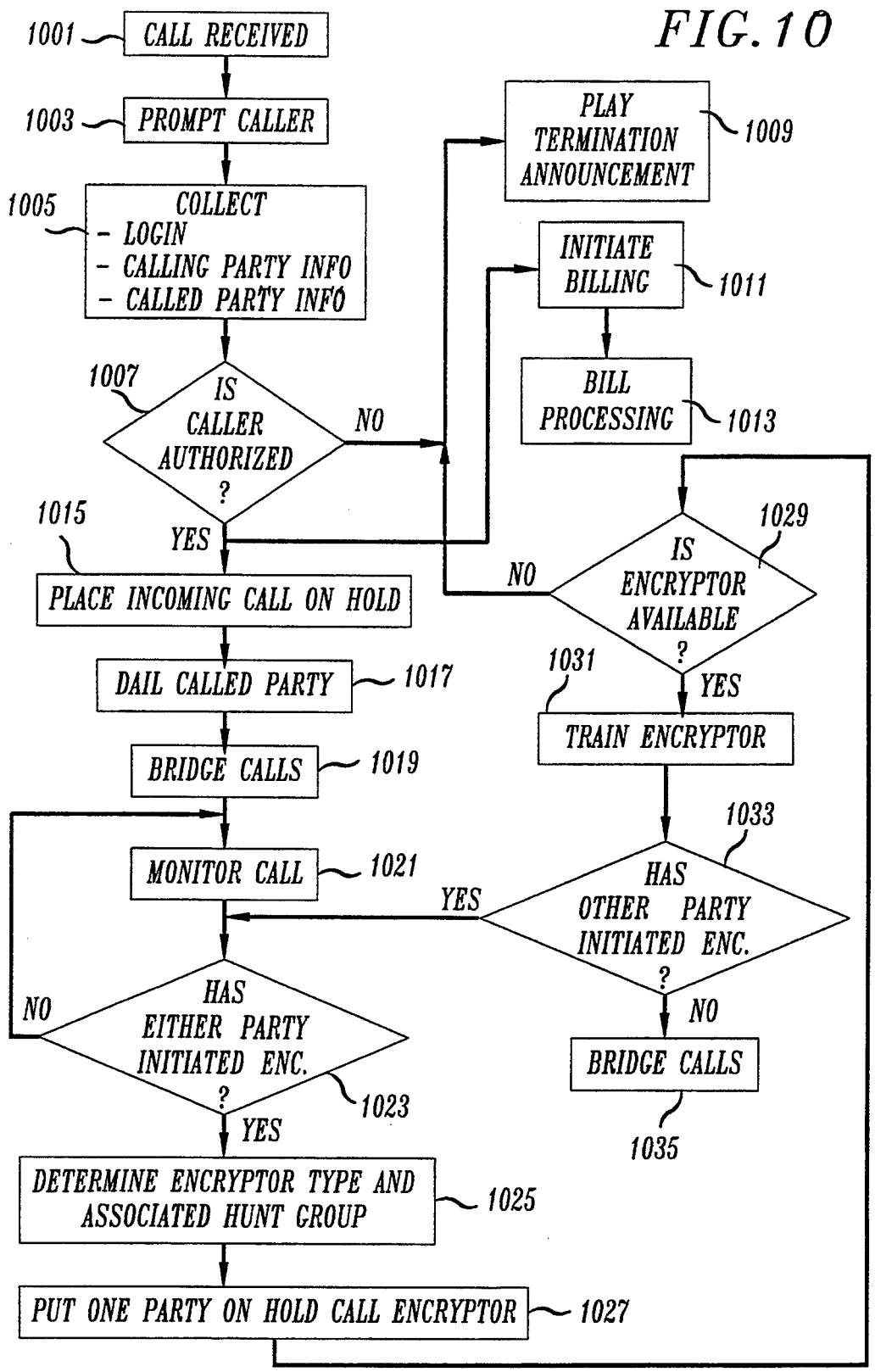
FIG. 10 is a flow diagram illustrating an alternative process for completing secure-to-clear, clear-to-secure, and secure-to-secure calls using security node 150.

An alternative process by which the system of FIG. 1 can be used to set up a secure-to-clear call is illustrated in the flow diagram of FIG. 10 and the hardware diagrams of FIGS. 11-15. (A similar process would be followed for clear-to secure and secure-to-secure calls.) This process differs from that described above in several important aspects. First, an end to end connection is established between calling and called parties before any encryptors are inserted in the call path. Second, controller 152 is removed from the call path after encryption begins. Third, encryptor "type" information is provided automatically to node 150, at the time when either party desires to begin secure communication.

The process begins upon receipt of a call (step 1001), whereupon switch controller 152 prompts the caller (step 1003) for login, password and called party number information needed to complete the call. Encryptor "type" information is not provided at this point. The information is collected (step 1005) and stored in database 154. If the caller is an authorized user (step 1007), controller 152 then places the incoming call (from CPE 101) on hold (step 1015) and transmits called party information previously stored in database 154 to switch 151 in order to initiate a call to CPE 102 in step 217. As with the process of FIG. 2, routing of this call is from controller 152 to switch 151 via line 168, from switch 151 to switch 125 via trunk 163, and then through telecommunications network 156 to CPE 102. If the caller is authorized, billing and bill processing are initiated (steps 1011 and 1013); if the caller is not authorized, a termination announcement is played (step 1009).

When the called party answers, controller 152 signals switch 151 to bridge (step 1019) the call TO controller 152 with the call FROM controller 152. This establishes a clear communication path between both parties and leaves one "appearance" of controller 152 temporarily in the path, so that it can continue to "monitor" the call (step 1021) for the occurrence of control signals indicating that either party desires to transfer the call from the clear mode to the encrypted mode.

If it is determined in step 1023 that either party has transmitted a "begin secure transmission" signal to controller 152 indicating a desire to encrypt information transmitted over the portion of the transmission path between that party's CPE and node 150, a determination is made (step 1025) of the type of encryptor being used in that CPE. Such determination is made "automatically" by controller 152, which recognizes a code indicative of the encryption type that is sent together with the "begin secure transmission" signal. Until a "begin secure transmission" signal is detected, step 1021 is repeated.

The training message may include DTMF tones or other signaling information that specifies the type of encrypting device being used by the calling party. Alternatively, an Adjunct Switch Application Interface (ASAI) in switch 151 can recognize DTMF tones generated in CPE 101 during call set-up. In this event, both the encryption type as well as the hunt group number(s) associated with that type of encryptor, can be determined automatically and sent to controller 152.

Step 1025 also involves determination of the "hunt group" for the appropriate encryptors. Specifically, when controller 152 has determined the type of encryption being used in the CPE that initiated the "begin secure transmission" signal, a lookup operation is performed in database 154 to determine the hunt group designation associated with the appropriate encryptors within encryptor bank 170. Controller 152 (step 1027) then signals switch 151 to place one party (i.e., the party that did not generate the "begin encryption signal") on hold, and to initiate a call to the hunt group associated with the selected encryptor type. When that hunt group is called, the next available encryptor of the appropriate type (e.g. encryptor 172 in Fig. 1) is selected by switch 151. However, if no encryptor of the selected type is available (step 1029), the process is terminated (step 1009).

When the training of encryptor 172 (step 1031), which follows the same process as described above in conjunction with FIG. 5, is complete, a determination is made in step 1033 as to whether, during the training interval, the other party (i.e., the party not involved in the step 1023 request for encryption) has signalled a request to initiate encryption of messages sent over the remainder of the communication path. If not, the call placed on hold in step 1027 and the call from controller 152 to encryptor 172, are bridged in step 1035. At this point, controller 152 may be dropped from the communication path by sending an appropriate control signal to switch 151, which establishes a bridging connection internal to the switch. Note however, that because encryptor training was accomplished with controller 152 in the communication path, it is important that removal of controller 152 from the path not disturb the ability of CPE 101 and 102 and encryptors 172 and 174 to continue encrypted communication. This can be arranged by assuring that controller 152 introduces only negligible delay and frequency distortion in the communication path.

If the other party has signalled a request to initiate encryption, steps 1025–1031 are repeated with respect to that party's encryptor type. In this manner, a secure-to-secure call is completed.

Figure 11:
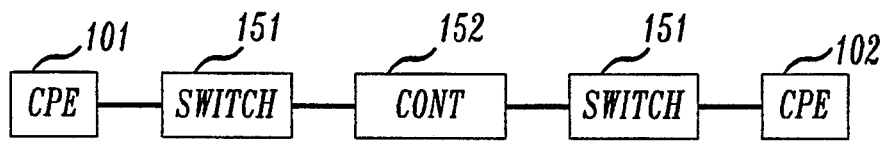
FIGS. 11-15 illustrate the hardware arrangements during various steps in the process of FIG. 10.

The hardware diagrams in FIGS. 11–15 illustrate the process depicted in FIG. 10. FIG. 11 illustrates the arrangement of CPE 101 and 102, switch 151 and controller 152, after step 1019 is completed. Note that controller 152 is inserted in the clear communication path that exists between calling and called parties.

Figure 12:
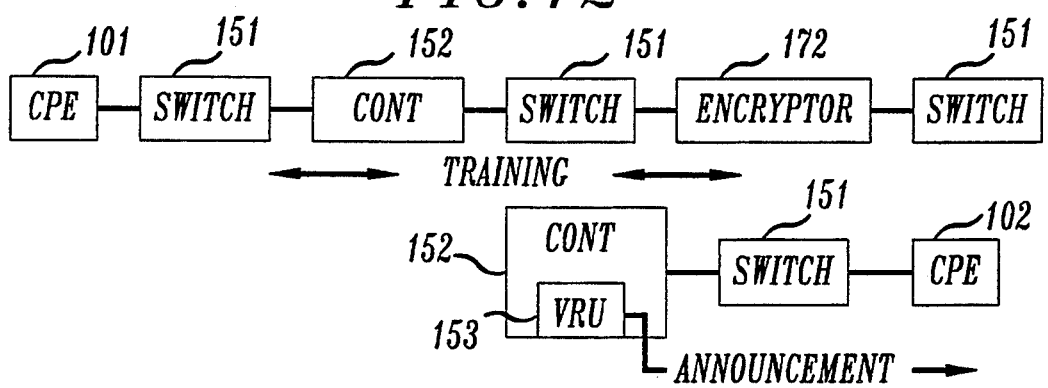

In FIG. 12, the arrangement of the same hardware components is illustrated after step 1031 is completed. At this point in the process, encryptor 172 is training with the encryption module in CPE 101, and, concurrently, the called party at CPE 102 is on hold, typically receiving an announcement from VRU 153 in controller 152 indicating that training is ongoing with the other party.

Figure 13:
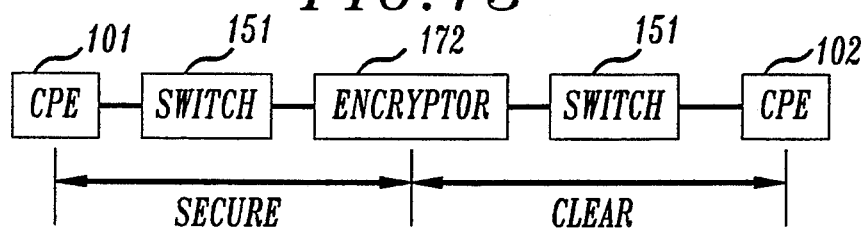

In FIG. 13, the process of FIG. 10 has been completed with respect to a secure-to-clear call. Note that the hardware arrangement is similar to that shown in FIG. 3, with the exception of the fact that controller 152 is not in the communication path.

Figure 14:
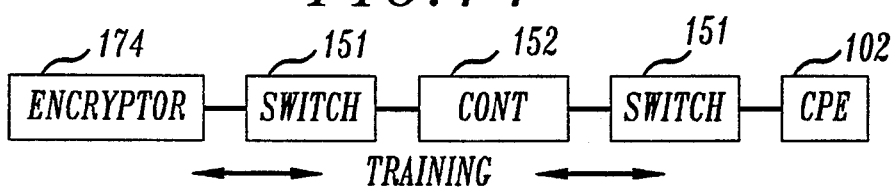
Figure 15:
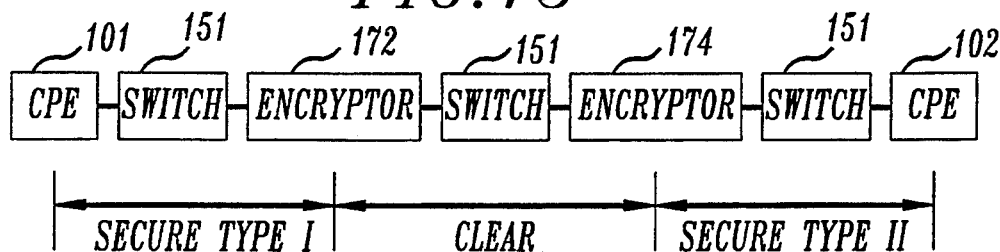

FIG. 14 illustrates the additional elements involved in a secure-to-secure call, when the other party initiates encryption in step 1033. As shown, the encryption module in called party CPE 102 is training with a second encryptor, encryptor 174. When the training process is complete, the hardware arrangement is as illustrated in FIG. 15. Note that this arrangement is similar to that shown in Fig. 7, with the exception of the fact that controller 152 is not in the communication path.

Various modifications may be made to the arrangement illustrated in the figures, without departing from the spirit and scope of the present invention. Several examples will illustrate:

To protect against fraud and other abuses, security node 150 may be arranged to track the number of call attempts per calling party (as determined by monitoring ANI) to access that node. After a predetermined number of attempts within a predetermined time interval, the security node automatically blocks any further attempts from that calling party (ANI) to gain access into the node. Secure addressing may also be provided. This permits securing the call from the calling STD or CPE to the security node prior to inputting the called number, so that an eavesdropper cannot ascertain the called number and/or dialing patterns of the calling party.

The present invention may be used in conjunction with various services that are already available, as well as many new services that are to be offered in the future. For example, secure voice and fax storage and retrieval supports a clear-to-secure call, allowing the incoming message on ring no-answer or busy to be forwarded to a secure mailbox where the message will be stored in encrypted format for subsequent access by the called party. This protects the encrypted message in a secure location until it can be retrieved by an authorized party. The calling party can be assured that the information is safe until it gets to the intended recipient.

While portions of the foregoing description mentioned voice calls, it is to be clearly understood that the present invention can be utilized as well in connection with the communication of all types of secure data. For example, the invention is ideal for protecting transmissions between PCs and between PCs and mainframe computers. This application requires only that the STD interface between the telephone equipment and the telephone line be appropriately modified, which is easily accomplished by persons of ordinary skill. In the same vein, secure fax may be used to protect transmissions between fax machines and fax store and forward services. Authentication of receipt of the fax (to whom was fax the delivered) can also be provided, With respect to call billing, various arrangements are possible. For example, security node 150 may be arranged to capture originating and terminating ANI, and call duration information associated with each User I.D. #. This information, along with the main billing number are then passed to bill rating and formatting system 187, for processing based on the subscribers outbound calling plan and inclusion into the customer's bill. The call is rated based on the call flow between the-originating and termination locations, not between originating location to security node to terminating location. Thus, the cost of delivering the call to and from security node 150 will typically be part of the encrypting/decrypting feature charge, and will not appear as an item on the subscribers billing statement. Billing will begin when answer supervision is provided from the called end to security node 150. Different billing arrangement may be used for subscriber initiated calls (i.e., secure-to-clear, secure-to-secure), in which the cost of the call can be applied to the calling subscriber's bill, as compared to clear-to-secure calls, for which the called subscriber will assume responsibility for the cost of the call (as if it were a collect call).

Finally, while the preceding description illustrates switch 151 and controller 152 as separate apparatus, it is envisioned that a single "intelligent switch" capable of monitoring calls, issuing voice prompts and collecting responses, storing information, making connections under the control of stored programs, and performing various associated functions, can be disposed within the telecommunications network and used instead.

We claim:

1. A system enabling communications between a plurality of calling parties and a plurality of respective called parties via a switched telecommunications network, said system comprising customer premise equipment connected to said switched telecommunications network for originating calls from said calling parties to said called parties, each of said calls containing encrypted information, means in said network for routing each of said calls to a multi-user security node disposed in said switched telecommunications network, said node being arranged to process multiple calls simultaneously, and means in said security node arranged for each of said calls to (a) decrypt said encrypted information received from said customer premise equipment and (b) obtain information needed to route said call through said network, so that said encrypted information is communicated to said respective called parties in non-encrypted form.

2. The invention defined in claim 1 wherein said security node includes a switch;

a plurality of decryptors; and means for controlling said switch to route said encrypted information to a particular available one of said decryptors.

3. The invention defined in claim 2 wherein said controlling means includes a database;

means for determining the particular type of encryption used in said customer premise equipment; and means for retrieving information stored in said database associating each of said encryption types with particular ones of said decryptors.

4. A security node disposed within a switched telecommunications network, comprising means for receiving a plurality of calls each containing encrypted information from a particular calling party, means for routing said calls through a plurality of decryptors to generate for each of said calls, clear information corresponding to said encrypted information, and means for transmitting said clear information to respective called parties, wherein said routing means includes:

(a) means for obtaining destination information from said calling parties identifying said called respective called parties, and (b) means for supplying said destination information to a switch in said telecommunication network to complete routing of said clear information through said network.

5. A system enabling simultaneous plural communications between a plurality of calling parties and a plurality of respective called parties via respective call paths which each include a switched telecommunications network, said system comprising customer premise equipment for applying non-encrypted information originated by each of said calling parties and destined for a respective one of said called parties, to said telecommunications network, and a security node disposed in said switched telecommunications network arranged for each of said simultaneous plural communications to (a) generate encrypted information corresponding to said non-encrypted information received from said customer premise equipment, (b) obtain the telephone number associated with said respective one of said called parties and (c) supply said telephone number to said switched telecommunication network in order to route said encrypted information to said respective one of said called parties, whereby for each of said simultaneous plural communications over at least a portion of each of said respective call paths are encrypted and communications over the remainder of each of said respective call paths are non-encrypted.

6. The invention defined in claim 5 wherein said security node includes a switch;

a plurality of encryptors; and means for controlling said switch to route said non-encrypted information to a particular one of said encryptors.

7. The invention defined in claim 6 wherein said controlling means includes a database;

means for determining the particular type of encryption used by each of said called parties; and means for retrieving information stored in said database associating each of said encryption types with particular ones of said encryptors.

8. A security node disposed within a switched telecommunications network, comprising means for receiving non-encrypted information from each of multiple calling parties, means for routing said non-encrypted information from each of said calling parties through a selected one of a plurality of encryptors in said security node to generate corresponding encrypted information, and means for transmitting said encrypted information to respective called parties, wherein said routing means includes:

(a) means for obtaining destination information identifying said called parties, and (b) means for using said destination information to complete routing of said encrypted information through said network.

9. A system enabling multiple simultaneous communications each communication between a calling party and a respective called party via a call path which includes a switched telecommunications network, said system comprising (a) for each calling party and said respective called party, customer premise equipment for encrypting information originated by said calling party and destined for said called party using a first encryption algorithm, (b) means for transmitting said encrypted information from said customer premise equipment to a security node disposed in said switched telecommunications network via a first call path, (c) means in said security node arranged to convert said encrypted information received from said customer premise equipment to information encrypted using a second encryption algorithm different from said first encryption algorithm, (d) means in said security node for receiving routing information identifying said called party, and (e) means responsive to said routing information for transmitting said converted information from said security node to said called party via a second call path, wherein for each calling party and said respective called party, communications over said first call path are encrypted using said first encryption algorithm and wherein communications over said second call path are encrypted using said second encryption algorithm.

10. The invention defined in claim 9 wherein said security node includes a switch;

a plurality of encryptors and decryptors arranged to encrypt said information originated by said each calling party and to convert said encrypted information to information encrypted using a second encryption algorithm; and means for controlling said switch to route said encrypted information through particular ones of said decryptors and encryptors.

11. The invention defined in claim 10 wherein said controlling means includes a database;

means for determining the particular types of encryption used in said first and second customer premise equipment; and means for retrieving information stored in said database associating each of said encryption types with particular ones of said encryptors and decryptors.

12. A security node disposed within a switched telecommunications network, comprising means for simultaneously receiving plural calls from a plurality of different calling parties, each of said calls containing information encrypted using a first encryption format, means for (a) routing each of said calls containing said encrypted information through a respective decryptor to generate corresponding clear information, and (b) routing each of said calls containing said corresponding clear information through a respective encryptor to generate newly encrypted information using a second encryption format, and means for transmitting each of said calls containing said newly encrypted information to a plurality of different called parties, wherein said transmitting means further includes:

(a) means for obtaining destination information from each of said calling parties identifying a respective one of said called parties, and (b) means for supplying said destination information to said switched telecommunication network to complete routing of each of said calls containing said newly encrypted information through said network to said plurality of called parties.

13. A security node for processing encrypted communications routed through a switched telecommunications system, said security node comprising a plurality of encryptors of different types, each encryptor being arranged to encrypt/decrypt communications using a different encryption/decryption algorithm;

a PBX arranged to route each of a plurality of incoming communications to a respective one of a plurality of hunt groups in response to a signaling message provided to said PBX, whereby a communication routed to any of said hunt groups is connected to an available one of said encryptors of a particular type;

means for providing said signaling message to said PBX in accordance with the particular encryption/decryption algorithm used by each of said incoming communications; and means for prompting users of said security node for routing information used to route outgoing communications from said security node through said switched telecommunications system.

14. A communication method for transmitting information between a plurality of calling parties and a plurality of respective called parties via a security node disposed in a switched telecommunications network, said method comprising the steps of applying encrypted information originated by said calling parties and destined for said called parties, and information indicating the identity of said called parties to said security node, decrypting said encrypted information received from said calling parties in said security node before said information is communicated to said called parties in non-encrypted form; and routing said non-encrypted information to said called parties using said identity indicating information.

15. The method defined in claim 14 wherein said security node includes a switch and a plurality of decryptors, and wherein said method further includes the step of controlling said switch to route said encrypted information to a particular one of said decryptors.

16. The method defined in claim 15 wherein said controlling step includes:

determining the particular type of encryption used in said customer premise equipment; and retrieving information stored in a database associating each of said encryption types with particular ones of said decryptors.

17. A method of providing security functions within a switched telecommunications network, comprising the steps of receiving a plurality of calls, each call containing encrypted information from a particular calling party, said calls being received in a security node disposed within said network;

routing said calls through a plurality of decryptors in said node to generate for each of said calls, clear information corresponding to said encrypted information; and transmitting said clear information from said node to respective called parties, wherein said routing step includes:

(a) obtaining destination information from said calling parties identifying said respective called parties, and (b) supplying said destination information to a switch in said telecommunications network to complete routing of said clear information through said network.

18. A method for enabling simultaneous plural communications between a plurality of calling parties and a plurality of respective called parties via respective call paths which each include a switched telecommunications network, comprising the steps of applying non-encrypted information originated by each of said calling parties from first customer premise equipment and destined for a respective one of said called parties, to a security node disposed in said telecommunications network encrypting said non-encrypted information received from said first customer premise equipment in said security node, applying routing information associated with said called parties to said security node, and responsive to said routing information, routing said encrypted information to said called parties, whereby each of said simultaneous plural communications over at least a first portion of each of said respective call paths are non-encrypted and communications over the remainder of said call paths are encrypted.

19. A method of processing secure communications within a switched telecommunications network, comprising the steps of routing information originating from a calling party using a particular type of encryption to a security node disposed within said network;

routing said encrypted information through an appropriate one of a plurality of decryptors in said security node arranged to generate corresponding clear information;

transmitting said clear information from said node to a called party together with destination information identifying said called party; and performing the previously mentioned steps simultaneously for each of a plurality of calls.

20. A method of providing secure communications between a plurality of calling parties and a respective plurality of called parties, comprising the steps of establishing a clear communications path in a telecommunications network connecting each of said calling parties and a respective one of said called parties, monitoring said communications path to detect a signal indicative of a desire by one of said parties to begin secure communications; and converting communications in at least a portion of said communication path from clear to secure, wherein said establishing step includes routing a call from one of said calling parties to the respective one of said called parties via an intelligent switch disposed in said telecommunications network, and said converting step includes controlling said intelligent switch to insert selected encryption apparatus in said communication path compatible with associated encryption apparatus used by said one of said calling parties.

21. The invention defined in claim 20 wherein said method further includes the steps of querying said one party to identify the type of encryption algorithm used in said associated encryption apparatus; and choosing said selected encryption apparatus in accordance with the response to said query.

22. The method defined in claim 20 further including the steps of monitoring said communications path to detect a signal indicative of a desire by said respective one of said called parties to provide secure communications; and converting communications in the remainder of said communication path from clear to secure.

23. A method for decrypting encrypted information in calls routed through a switched telecommunications system, said method comprising the steps of applying said calls to a PBX in the public switched telecommunications network;

routing said calls through said PBX to one of a plurality of hunt groups in said PBX in response to signaling messages provided to said PBX, connecting calls made to each of said hunt groups to available associated decryptors arranged to decrypt said encrypted information using a decryption algorithm appropriate for said encrypted information; and providing said signaling messages to said PBX in accordance with the particular encryption algorithms used to encrypt said encrypted information, whereby each call of a plurality of calls are routed to any available one of said decryptors of an appropriate type.

* * * * *